US009394875B2

(12) United States Patent
Wang et al.

(10) Patent No.: US 9,394,875 B2
(45) Date of Patent: Jul. 19, 2016

(54) SYSTEM FOR HARVESTING WATER WAVE ENERGY

(71) Applicants: Zhong Lin Wang, Atlanta, GA (US); Yanjie Su, Atlanta, GA (US); Guang Zhu, Atlanta, GA (US); Jun Chen, Atlanta, GA (US)

(72) Inventors: Zhong Lin Wang, Atlanta, GA (US); Yanjie Su, Atlanta, GA (US); Guang Zhu, Atlanta, GA (US); Jun Chen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/819,142

(22) Filed: Aug. 5, 2015

(65) Prior Publication Data

US 2016/0040648 A1    Feb. 11, 2016

Related U.S. Application Data

(60) Provisional application No. 62/033,408, filed on Aug. 5, 2014.

(51) Int. Cl.
*H02N 1/04* (2006.01)
*F03B 13/14* (2006.01)
*F03B 13/20* (2006.01)
*H02H 1/04* (2006.01)

(52) U.S. Cl.
CPC ............. *F03B 13/14* (2013.01); *F03B 13/20* (2013.01); *H02H 1/04* (2013.01); *F05B 2220/709* (2013.01); *F05B 2280/40* (2013.01); *F05B 2280/4005* (2013.01); *F05B 2280/5011* (2013.01)

(58) Field of Classification Search
CPC ........................................................ H02N 1/04
USPC ............................................................. 290/53
See application file for complete search history.

(56) References Cited

U.S. PATENT DOCUMENTS

| 3,086,131 | A | * | 4/1963 | Ballentine | H02N 1/04 310/310 |
|---|---|---|---|---|---|
| 4,126,822 | A | * | 11/1978 | Wahlstrom | H02N 1/08 310/309 |
| 8,193,655 | B2 | * | 6/2012 | Roberts | H01L 41/22 290/53 |
| 2014/0084748 | A1 | * | 3/2014 | Wang | H02N 11/002 310/300 |
| 2014/0246950 | A1 | * | 9/2014 | Wang | H02N 1/04 310/310 |
| 2016/0028327 | A1 | * | 1/2016 | Aliane | B05D 3/065 310/300 |

OTHER PUBLICATIONS

Research and Pblication Office, Georgia Institute of technology, Triboelectric Generator Produces Electricity by HarnesingFrictional Forces, Jul. 10, 2012.*
Flexible triboelectric generator, Feng-Ru Fan et al., Jan. 4, 2012.*

* cited by examiner

*Primary Examiner* — Joseph Waks
(74) *Attorney, Agent, or Firm* — Bryan W. Bockhop; Bockhop Intellectual Property Law, LLC

(57) ABSTRACT

A generator for harvesting energy from water in motion includes a sheet of a hydrophobic material, having a first side and an opposite second side, that is triboelectrically more negative than water. A first electrode sheet is disposed on the second side of the sheet of a hydrophobic material. A second electrode sheet is disposed on the second side of the sheet of a hydrophobic material and is spaced apart from the first electrode sheet. Movement of the water across the first side induces an electrical potential imbalance between the first electrode sheet and the second electrode sheet.

17 Claims, 5 Drawing Sheets

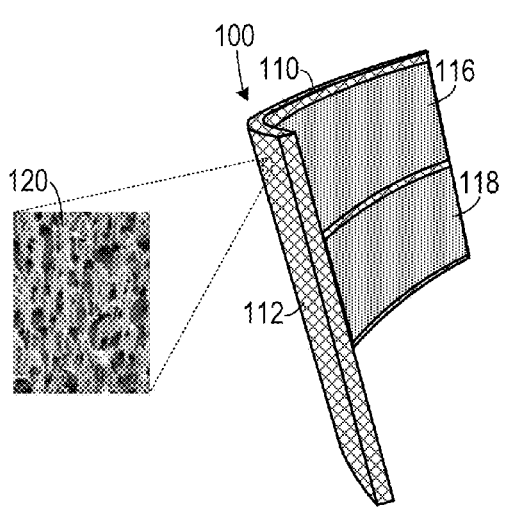
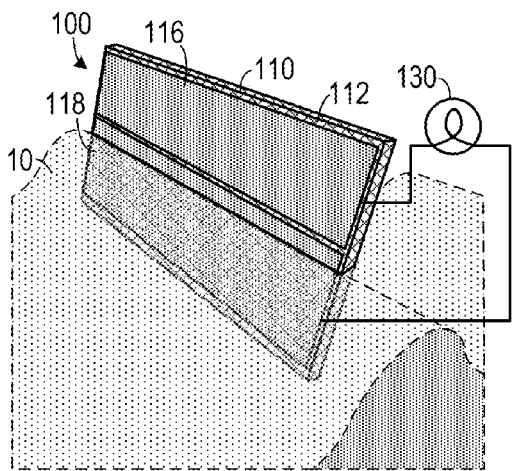
FIG. 1A   FIG. 1B
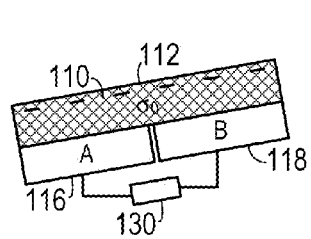 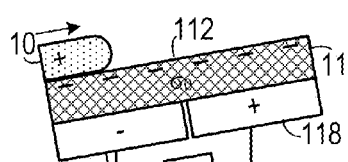 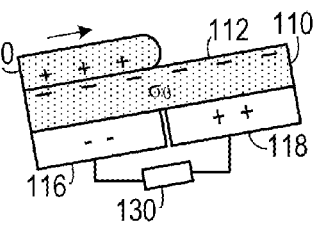
FIG. 2A   FIG. 2B   FIG. 2C
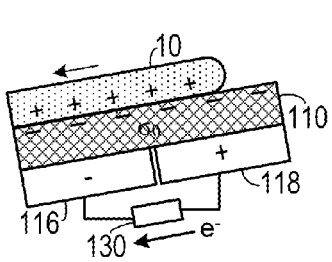 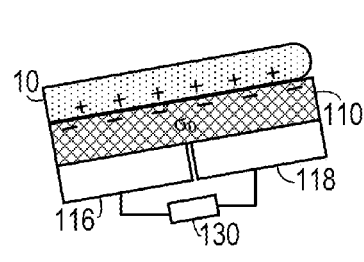 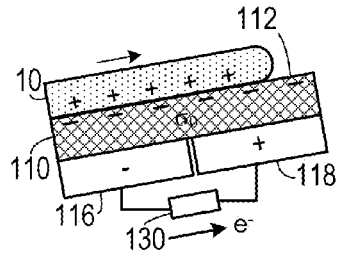
FIG. 2D   FIG. 2E   FIG. 2F

SYSTEM FOR HARVESTING WATER WAVE ENERGY

CROSS-REFERENCE TO RELATED APPLICATION(S)

This application claims the benefit of U.S. Provisional Patent Application Ser. No. 62/033,408, filed Aug. 5, 2014, the entirety of which is hereby incorporated herein by reference.

STATEMENT OF GOVERNMENT INTEREST

This invention was made with government support under agreement No. DE-FG02-07ER46394, awarded by the Department of Energy. The government has certain rights in the invention.

BACKGROUND OF THE INVENTION

1. Field of the Invention

The present invention relates to systems for harvesting energy from water motion and, more specifically, systems that employ the triboelectric effect to harvest water energy.

2. Description of the Related Art

Ambient water motion, presented in forms of river flows, ocean tides and waves, and even rain drops, contain a gigantic reserve of renewable mechanical energy. Taking advantage of this energy has major significance in grid-level energy generation by large-scale power plants for public utilities in order to relieve our sole reliance on limited fossil fuels. Moreover, it also provides a viable route to fulfilling on-site power demand for long-term operation of self-powered autonomous systems, such as off-grid and stand-alone facilities, or remote sensor networks. Most of previously demonstrated converters for water motions depended on normal electromagnetic generators that were bulky and heavy in order for decent output power and conversion efficiency. Besides, they usually required other essential components, such as an absorber that collected ambient water motions, and a turbine that drove the generator, which further expanded the size of the system and added complicity as well as cost. Moreover, natural water motions, especially waves, can be categorized into a number of forms; and not all of them are suitable for driving a turbine. Therefore, a small-sized, lightweight, cost-effective, and all-in-one approach that can directly interact with water bodies is greatly desirable as a key to solving to the problems above.

Initial efforts with this regard included flexible piezoelectric strips (so-called 'eels') that undulated in water flow as driven by vortices shed from an upstream bluff body, and low-dimensional carbon nanostructure, e.g. carbon nanotubes and few-layered graphene, over which voltages were induced when polar liquids flew. In the former design, reciprocating-strained eels posed a major challenge to prolonged operation due to mechanical fatigue especially of electrodes, while the latter was restricted by materials availability and by ion concentrations in waters. Besides, both of them only harnessed constant water currents, leaving other forms of water motions largely intact.

Therefore, there is a need for an efficient system for harvesting energy from wave action.

SUMMARY OF THE INVENTION

One aspect of the invention is a liquid-solid electrification-enabled generator (LSEG) for harvesting energy from a variety of water motions. Coupled with electrostatic induction, surface triboelectric charges resulting from interaction with water induce free electrons to flow alternatingly between electrodes as the device has repeatedly varying contact area with the surrounding water body. Having a planar structure (6 cm by 3 cm by 50 um), one layer of the LSEG generates an optimum average output power of 0.12 mW at a relative velocity of 0.5 m/s. Nanowire-based modification from polymer nanowires plays a key role in obtaining such an output power. The all-in-one LSEG does not require extra mechanical components for capturing or transmitting mechanical motions; and its stationary and strain-free design has electrodes fully imbedded and secured without any movable parts, which ensures its durability and reliability for long-term operation. Made from conventional polymeric materials, it is highly cost-effective and easily scalable in size. An integrated LSEG with an array of electrodes is demonstrated as a power source for tens of LED bulbs by harvesting ambient energy from waving water surface and even falling water drops, explicitly demonstrating the potential of deploying the LSEG on ocean/river surface, at coastal/offshore areas, and even in rainy places for applications such as monitoring, surveillance, and navigation.

In another aspect, the invention is a triboelectric nanogenerator (TENG) that is employed for harvesting large-scale water wave energy. Relying on surface contact electrification effect between the conventional polymers and very thin layer of metal as electrodes, the TENG-NW (TENG employing nanowires) is extremely light-weight, low-cost, high anticorrosion to the marine environment and capable of floating on the surface of water for wave energy harvesting. By using the collision of a rolling ball caused contact and separation, the TENG converts the slow, random and high-force all-directional oscillatory motions into electricity.

In another aspect, the invention is a generator for harvesting energy from water in motion that includes a sheet of a hydrophobic material, having a first side and an opposite second side, that is triboelectrically more negative than water. A first electrode sheet is disposed on the second side of the sheet of a hydrophobic material. A second electrode sheet is disposed on the second side of the sheet of a hydrophobic material and is spaced apart from the first electrode sheet. Movement of the water across the first side induces an electrical potential imbalance between the first electrode sheet and the second electrode sheet.

In yet another aspect, the invention is a generator for harvesting energy from water in motion that includes a confining frame. At least one contact mode triboelectric nanogenerator is disposed within the confining frame. An inertial member is disposed within the confining frame. The inertial member has at least one degree of freedom of movement and is disposed to be able to impart force on the at least one contact mode triboelectric nanogenerator when the confining frame is moved during wave action, thereby causing the triboelectric generator to generate and electrical current.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1A is a schematic diagram of one embodiment of an LSEG. is a structural design of the LSEG including a detail SEM image of polymer nanowires on one side of the polymer layer.

FIG. 1B is a schematic diagram of an LSEG positioned in water waves.

FIGS. 2A-2F are a series of schematic diagrams showing an electricity-generating process using an LSEG, in which: in FIG. 2A, the entire device is completely out of the water; in FIG. 2B, electrode A is partially submerged as a result of rising water wave and in which free electrons are induced from electrode B to electrode A; in FIG. 2C, the water surface levels with the middle point of the device; in FIG. 2D, electrode B is being covered by water and free electrons flow back to electrode B; in FIG. 2E, the entire device is completely submerged; and in FIG. 2F, the wave is receding, making electrode B partially exposed.

FIGS. 3A-3C are a series of graphs showing electric measurement results as the LSEG is repetitively submerged at a moving velocity of 0.5 m/s, in which FIG. 3A shows Short-circuit current; FIG. 3B shows Induced charges without extra load between electrodes; and FIG. 3C shows Open-circuit voltage.

DETAILED DESCRIPTION OF THE INVENTION

Figure 3A:
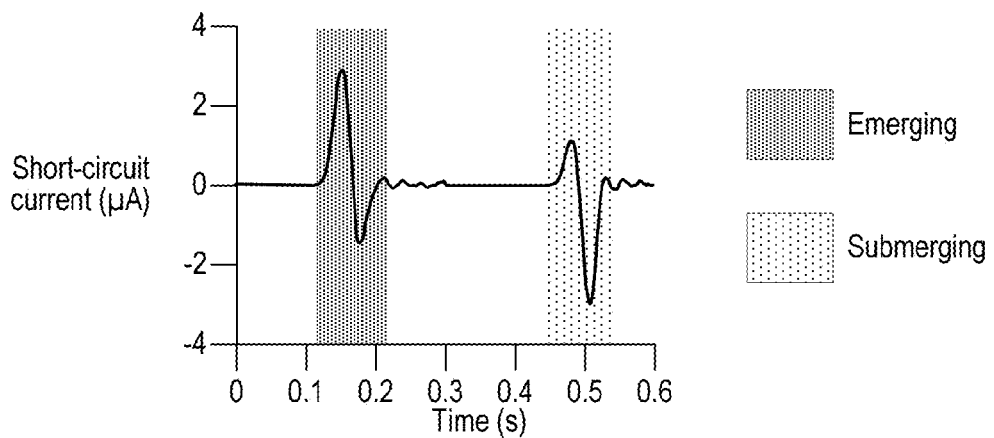

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 13/598,132, filed on Aug. 29, 2012 by Wang et al. and published as US-2013-0049531-A1 and U.S. patent application Ser. No. 14/189,656, filed on Feb. 25, 2014 by Wang et al. and published as US-2014-0246950-A1 each disclose methods of fabricating and operation of triboelectric generators and are therefore incorporated herein by reference.

A basic unit of the LSEG 100 is shown in FIGS. 1A and 1B. On one side of a fluorinated ethylene propylene (FEP) thin film 110, two parallel strip-shaped electrodes 116 and 118 are fabricated, which are discrete with a fine gap in between. The other side of the FEP layer, modified to intentionally create patterned surface roughness at nano scale (as shown in the detail of surface roughness through nanowires 120), directly interacts with ambient water to generate surface triboelectric charges at the liquid-solid interface. The vertically aligned nanowires 120 (about 100 nm in diameter and about 2 μm in length) are for promoting the output power of the LSEG 100 by enhancing contact area with the water 10. FEP is chosen for a number of reasons. Primarily, it is the most negative material that is commercially available with respect to triboelectric polarity, which enables superior surface charging ability compared with other materials. Other advantageous features, including heat resistance, radiation stability, and chemical inertness, makes FEP a desirable and durable material for underwater operation. The fabricated layer may be applied onto a substrate for quantitative measurement.

The operation of the LSEG 100 relies on a repetitive emerging-submerging process with travelling water 10 waves (as shown in FIG. 1B and in FIGS. 2A-2F), in which the coupling between triboelectrification and electrostatic induction gives rise to alternating flows of electrons between electrodes 116 and 118. Contact electrification between a triboelectrically negative material 112 (e.g. a fluorinated polymer) and water 10 generate surface triboelectric charges at the contact interface with negative charges on the solid surface. Generally, this charging phenomenon is explained using an interfacial electrical double-layer model, which takes into account the ions in the liquid adsorbed onto the solid surface. After interacting with water the FEP surface retains a layer of negative surface charges that do not dissipate in an extended period of time (as shown in FIG. 2A). The nanowires 112 fabricated on the surface of the film 110 make it hydrophobic so that water is repelled immediately after the descending of the water surface. As shown in FIG. 2B, once electrode A 116 is partially submerged by the rising water wave 10, positive charges in water (such as hydroxonium) screen the negative triboelectric charges on the FEP surface 110 by forming an interfacial electrical double layer. As a result, unbalanced electric potential between the two electrodes due to the asymmetric distribution of charges drive free electrons to flow from electrode B 118 to electrode A 116 until the device is submerged halfway (as shown in FIG. 2C) then corresponds to the state with the maximum quantity of induced charges on the electrodes 116 and 118. As electrode B 118 starts to be sunk in the water, induced electrons flow back to electrode B 118 since the electric potential distribution varies towards equilibrium (as shown in FIG. 2D). Finally, when the device is completely covered by water 10, triboelectric charges are entirely screened. Consequently, all induced charges vanish (as shown in FIG. 2E), similar to the state shown in FIG. 2A. If the wave then recedes, another alternating cycle of the current is then produced (as shown in FIG. 2F). Therefore, the generated electricity is attributed to the sequential process of contact electrification and asymmetric-screening-enabled electrostatic induction.

Figure 3B:
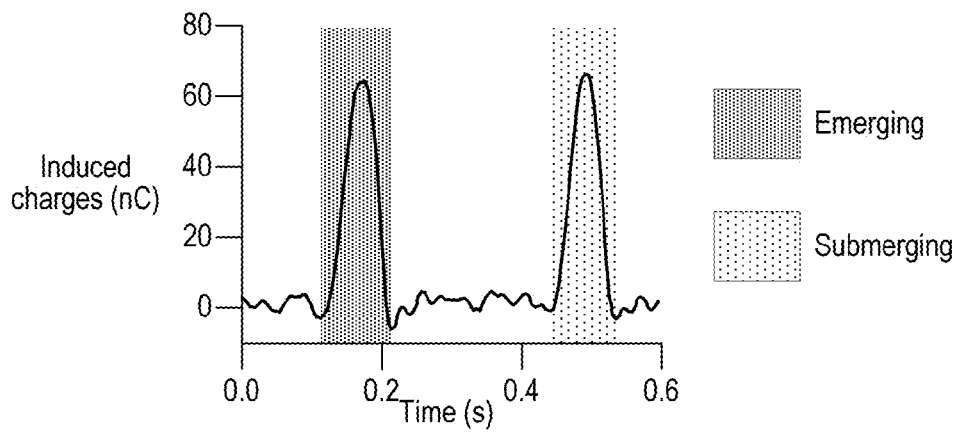
Figure 3C:
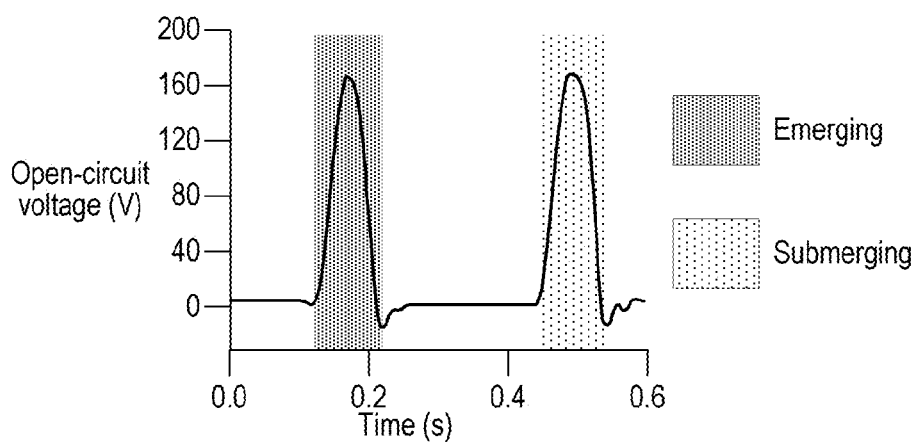

In one experimental embodiment, for quantitative measurement, relative motion between the LSEG and water was achieved by a linear electric motor that drove the LSEG for reciprocating motion at controlled velocities. Here, regular tap water was used. As shown in FIG. 3A, the short-circuit current ($I_{sc}$) has an alternating behavior with an amplitude of 3 μA at a velocity of 0.5 m/s. The total amount of induced charges in one cycle reaches 75 nC (as shown in FIG. 3B). An open circuit voltage of about 160 V was achieved, as shown in FIG. 3C.

In open-circuit condition, electrons cannot transfer between electrodes. During interaction with water, the open-circuit voltage ($V_{oc}$) defined as the electric potential difference between the two electrodes remains 0 at both the emerged (as shown in FIG. 2A) and submerged states (as shown in FIG. 2E). It reaches the maximum when the water surface levels with the middle point of the generator (as shown in FIG. 2C). Based on the model of infinitely large charged planes without consideration of edge effect,[25] the $V_{oc}$ can be analytical expressed by the following equation:

$$V_{oc} = \frac{d \cdot \sigma_0}{\varepsilon_0 \varepsilon_r} \quad (1)$$

where d is the thickness of the FEP layer, $\sigma_o$ is the triboelectric charge density on top of the FEP layer as a constant, $\in_0$ is the dielectric constant of vacuum, and $\in_r$ is the relative dielectric constant of FEP. FIG. 3c shows the measured $V_{oc}$ that oscillates between 0 and the maximum value of 160 V at the velocity of 0.5 m/s. By submitting the measured induced charges into equation (1) (d=75 μm, σ=~42 μC/m², $\in_r$=2.1), the peak-to-peak value of the $V_{oc}$ is theoretically calculated to be ~168 V, which agrees well with the experimentally measured value. Control groups using other thin-film materials that had inferior triboelectric negativity yielded reduced electric output; and relative magnitudes among different devices followed the material's triboelectric negativity of the electrification layer, which thus further supported the proposed operating principle.

Once an external load is applied, the amplitude of the output current drops as the load resistance increases. Here, the average output power is defined by the following equation:

$$W = I_{rms}^2 \cdot R \quad (3)$$

where $I_{rms}$ is the root mean value of the current amplitude, and R is the external load resistance. The average output power reaches the optimum value of 0.12 mW at the matched load of 80 MΩ. The energy conversion efficiency of this device is calculated to be around 7.7%. The detailed analysis is presented in Supporting Information.

Here, three categories of factors were investigated to determine how to tune the electric output of the LSEG, i.e. velocity of the relative movement, aspect ratio of the device, and ion concentration of the water body.

Firstly, relative velocity is a major factor that influences the electric output. It is interesting to notice that both the $V_{oc}$ and induced charges have approximately linear relationship with the velocity, respectively. The induced charges increase both by around 100% as the velocity increases from 0.1 m/s to 0.5 m/s, which is possibly attributed to velocity-dependent surface charging density. More triboelectric charges are generated on the FEP surface if more dynamic interaction with the water is involved, which was observed in previous studies on electrification between a fluorinated polymer and water. Further systematic investigations on kinetics of the charge-generation process are needed to provide more insights into the velocity-dependent electric output. Since the current amplitude is determined by two factors, that is, charge quantity and velocity. When both of the factors increase, the current rises at an increasing rate.

Secondly, design parameters, especially aspect-ratio of the device, also have a decisive effect on the electric output of the LSEG. It was observed that pre-existing charges in the water can influence subsequent charge transfer with a solid surface. Specifically, the water may have weaker ability to charge the solid surface once it already carries opposite charges. Here in our measurement, the LSEG was driven by a linear motor to have relative sliding with the static water body. As a result, it is the surface part of the water that actually has charge transfer with the LSEG surface. Once the LSEG starts to dip into the water, the surface part of the water is positively charged instantaneously. Subsequent electrification as the LSEG continues to dip in will become weaker due to the increasing pre-existing positive charges in the water. Therefore, it is very likely that the top part of the LSEG may have smaller surface charging density compared to the lower part. Given that the area is fixed, a narrower LSEG with a higher aspect ratio has shorter interaction distance with the water, more surface triboelectric charges, and then higher electric output accordingly. It is noticed that the $I_{sc}$ is again influenced to a larger extent. Therefore, fine feature of the electrode plays a key role in designing the high-performance LSEG.

Thirdly, ion concentration or conductivity of the water body also plays an important role. In a control experiment, the tap water was replaced by saturated sodium chloride solution with extremely high concentration of ions. Induced charges 40% lower were obtained with the same device as well as the same moving velocity. This is because low ion concentration assists generation of the triboelectric charges, while high concentration has the opposite effect. Even with the highest possible concentration, the LSEG can still provide an electric output power although at a mildly reduced magnitude, which is an indicator true applicability of our device in natural water bodies.

In addition, the effect of the nanostructured surface modification is clear in that devices with the nanowires provide an average enhancement in induced charges by 50% in comparison to those without the modification. Here, the nanostructured LSEG surface interacts between the bulk water body instead of a single static water droplet; and the dynamic interaction involves kinetic energy due to the non-stop emerging and submerging processes. As a result, the water can infiltrate, at least largely if not completely, into the aligned nanowires even though they are hydrophobic. Then, higher surface contact area and enhanced electric output can be obtained.

Instead of being driven by an electric motor for quantitative measurement, an integrated LSEG (I-LSEG) with a scaled-up design was further tested in normal environment where energy from ambient water motions was harvested. The I-LSEG consists of 6 strip-shaped electrodes with each having lateral dimensions of 20 cm by 6 mm. Then, a total of 5 basic units were formed by any pair of adjacent electrodes. The electric output of each pair was firstly rectified through an electric bridge and then constructively superimposed through parallel connection. In the first demonstration, the I-LSEG was vertically fixed in a water container with a tilting angle of 30° away from the vertical position. The water surface was level with the lower edge of the device. The container was then gently tilted back and forth to create travelling waves that washed the I-LSEG in a reciprocating way, similar to the circumstance along the seashore and the riverbank. Pulses of dc current are produced. Since the totally 5 units interact with the water sequentially instead of simultaneously, they result in 5 current pulses that merge together but with timing mismatch. The generated electricity could light up tens of LED bulbs, proving the capability of LSEG as a power source for electronics. This demonstration clearly indicates that our device can be potentially used along the seaside/riverside area. Besides, in company with a buoy, the LSEG can also be possibly deployed offshore on the ocean surface.

In light of the operating principle that only requires changing of the contact area with water, we further demonstrated energy harvesting from falling water or rain drops. The I-LSEG was still braced with the same tilting angle. A sprinkler head was used to spray water onto the device. As the water accumulated, droplets slid across the I-LSEG surface in perpendicular to the electrode array. Since a moving droplet could momentarily cover part of the device, electricity was generated as the droplet crossed boundaries between adjacent electrodes. With numerous droplets, a large number of current pulses merged together, leading to an apparent continuous dc output. Larger water droplets tend to create more fluctuation in the output current but not greatly change the overall performance. The electric output was again sufficient to power the LED bulbs. This demonstration further expands the applicability of the LSEG, providing a new means of energy harvesting from a largely unexploited energy source, namely natural precipitation.

One embodiment is a single-component energy converter that is made from thin-film materials. Without having any movable component, it generates electricity through triboelectric effect at the solid-liquid interface when directly interacting with ambient water bodies, showing a practically feasible technology for harvesting part of the wave energy.

Figure 4:
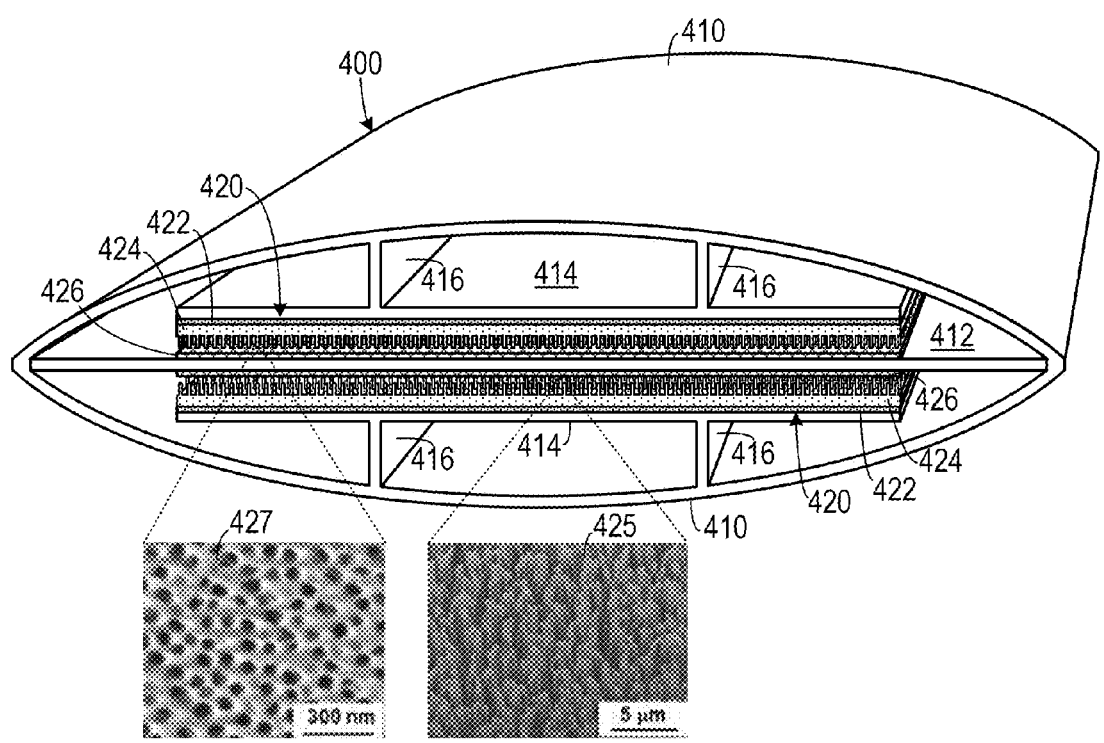
FIG. 4 is a schematic diagram of a shows a single unit in a TENG, including two details of a surface with nanopores and a surface with nanowires extending therefrom.

As shown in FIG. 4, another embodiment of a triboelectric generator (TENG) 400 for harvesting wave energy employs an arch-shaped top and bottom plates 410 with a multilayer core. Both the top and bottom plates 410 are made of polyethylene terephthalate, naturally bent by a heat treatment, which helps to carry out the action of effective charge separation and contact using the elasticity of the film. The top and bottom plates 410 each have vertical walls 416 extending inwardly therefrom and a lateral plate 414 being supported by the vertical walls 416. In one embodiment, an acrylic lateral plate 412 is held between the top and bottom plates 410. A copper electrode plate 422 is disposed on the inward surface of each of the lateral plates 414 and a triboelectric layer 424 (such as a PTFE film) is applied thereto. The triboelectric layer 424 is textured with a nanoscale texture, such as with nanowires 425 extending inwardly from the triboelectric layer film 424. An electrode layer 426 (such as an aluminum layer) is supported on each side of the lateral plate 412. The aluminum layer 426 would typically include a plurality of nanoscale pores 427 opening to its surface. Holding a sandwiched structure, both the upper layer and bottom layer of the functional core is polytetrafluoroethylene (PTFE) film 424 with deposited copper as back electrodes. PTFE nanowires arrays were created on the exposed PTFE surface by a top-down method through reactive ion etching, which largely enhance the charge density of contact electrification. A scanning electron microscopy (SEM) image of vertically aligned PTFE nanowires 425 is shown in FIG. 1C, which indicates that the average clustering diameter of FEP nanowires is 54±3 nm with an average length of 1.5±0.5 μm. Aluminum thin film 426 with nanoporous surface is sandwiched between the top and bottom layers of the functional core, playing dual roles as an electrode and a contact surface. An SEM image of nanopores 427 on the aluminum is shown in the detail of FIG. 4. The average diameter and depth of the aluminum nanopores are 57±5 nm and 0.8±0.2 μm, respectively, with a distribution density of 212 per μm². Acrylic was selected as the structural supporting material owing to its decent strength, light weight, good machinability and low cost.

Figure 5A:
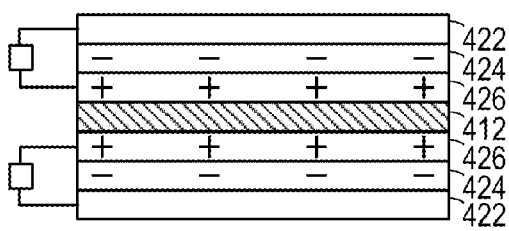
FIGS. 5A-5D are a series of schematic diagrams showing the operating principle of the TENG.
Figure 5B:
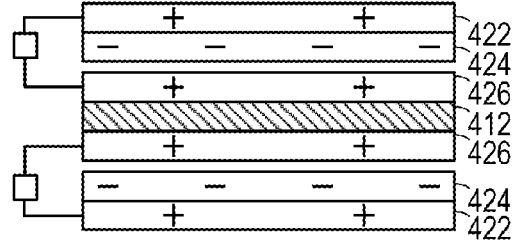
Figure 5D:
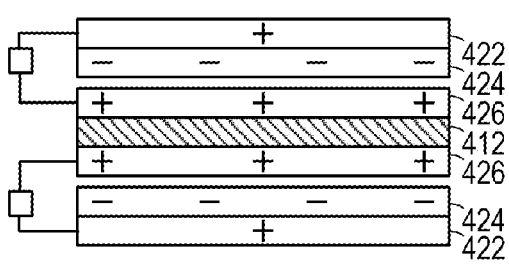
Figure 5C:
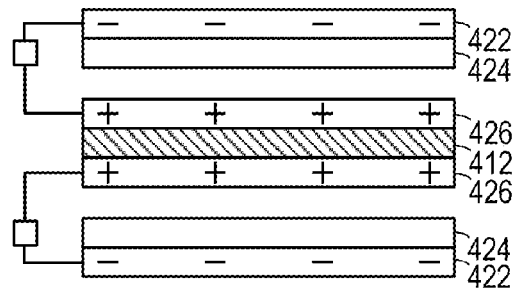

The fundamental working principle of the TENG 400 is based on the coupling between contact electrification and electrostatic induction, as shown in FIGS. 5A-5D and FIG. 6. Here, both two-dimensional schematic illustrations of charge distribution (up) and potential distribution by COMSOL (down) were used for illustration. When an external force, for example, the collision from a rolling ball 612, is applied to the top plate of the TENG 400, which brings the two layers of PTFE 424 into contact with the middle aluminum layers 426 simultaneously; charge transfer occurs at the contact interfaces. According to the triboelectric series, electrons are injected from aluminum into PTFE, since PTFE is much more triboelectrically negative than aluminum, generating positive triboelectric charges on the aluminum and negative ones on the PTFE (as shown in FIG. 5A). Subsequently, if the collision disappeared, the elasticity of the arch-shaped plates will lead to a separation between the PTFE 424 and the aluminum 426. As a result, the positive triboelectric charges and the negative ones no longer coincide on the same plane and generate an inner dipole moment between the two sets of contact surfaces. Such a dipole moment drives free electrons from the copper electrode to the aluminum electrode 426 to balance out the electric field, producing positively induced charges on the copper electrode (as shown in FIG. 5B). And the flow of electrons lasts until the upper plate reaches the highest point, where the corresponding separation is maximized (as shown in FIG. 5C). Continuously, a reduced separation between the contact surfaces will weakened the dipole moment, free electrons flow back to the copper electrode until the two contact surfaces come into contact (as shown in FIG. 5D), making a complete cycle of electricity generation process. Consequently, the kinetic energy from the water wave induced consecutive ball collisions result in a periodical-changing electric field that drives reciprocating flows of electrons between electrodes, producing alternating current in the external circuit.

Figure 6:
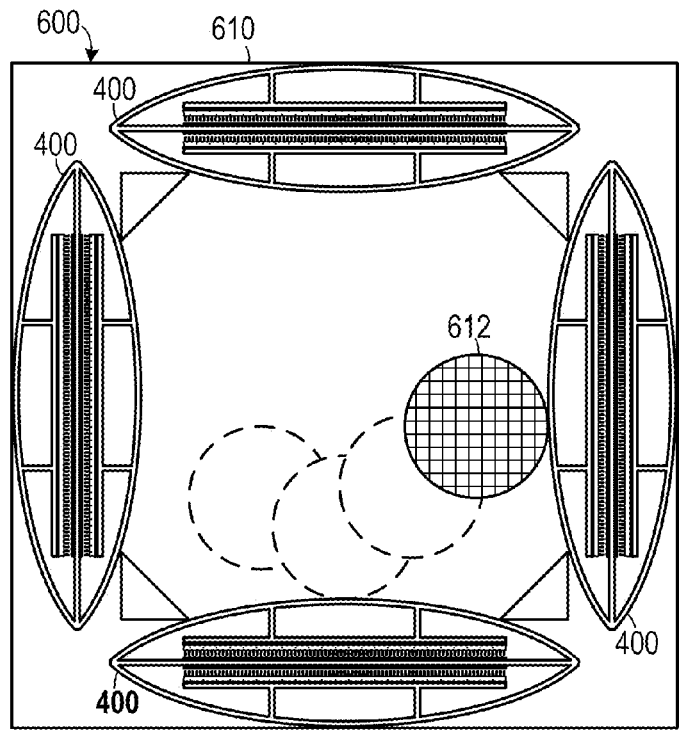
FIG. 6 is a schematic diagram of a TENG-NW unit and its electrical output characterization for water wave energy harvesting.
Figure 7:
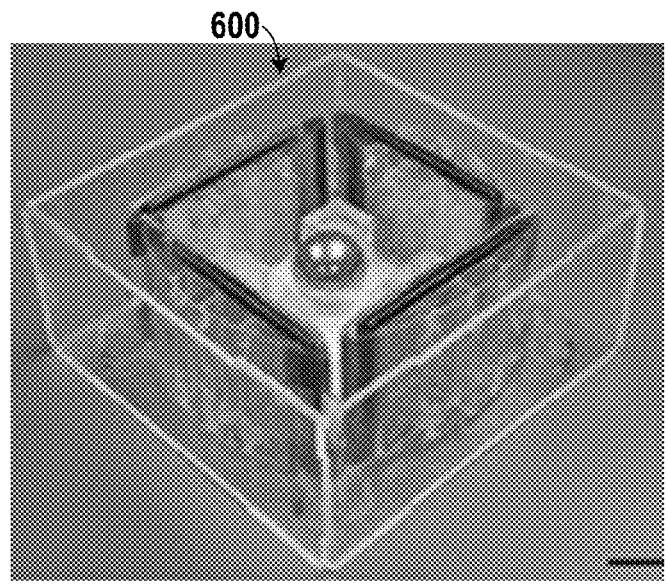
FIG. 7 is a perspective view of one embodiment of a TENG-NW.

One embodiment of a motion-driven TENG-NW unit 600 is shown in FIGS. 6 and 7. This embodiment can be used to generate electricity from water wave motion. The TENG-NW unit 600 includes a support frame 610 in which is disposed four TENGs 400 and a relatively movable inertial mass 612, such as a rolling ball. As the TENG-NW unit 600 is moved, for example by wave action, the inertial mass 612 is rolled into a TENG 400, causing them to compress. As the inertial mass 612 rolls away from a TENG 400, the TENG 400 decompresses.

In an experimental study of the performance of a single unit of a TENG-NW unit 600 for energy harvesting, a first step was to trigger the TENG by a ball collision as driven by gravity. A simple measurement platform was established, resort to that a 160-gram metal ball was controlled to collide at the center of the top plate with tunable acceleration and displacement. The voltage amplitude is an increasing function of the both acceleration and displacement of the rolling ball. Likewise, the current amplitude follows a same trend. And the open circuit voltage and short circuit current, induced by the ball collision at acceleration of 10 m/s² and a displacement of 9 cm, shot up to 569.9 V and 0.93 mA. The current amplitude drops with increasing load resistance owing to the ohmic loss, while the voltage follows a reverse trend. As a result, the instantaneous peak power is maximized at a load resistance of 1 MΩ, corresponding to a peak power density of 0.26 mW/cm².

To extrapolate the capability of the TENG-NW unit 600 for large scale blue energy harvesting, the TENG-NW unit 600 with a single unit was considered. The generated average power $E_0$ in a single current peak can be calculated as:

$$E_0 = \pi \cdot I_{sc} \cdot V_{oc} \cdot \Delta t$$

where $I_{sc}$ and $V_{oc}$ are the average short-circuit current and open-circuit voltage for the single unit, which are 50 μA and 180 V, respectively. $\Delta t$ is the peak width of the short-circuit current with a value of 0.0184 s. And α is a factor in a range of 0 to 1. For a rough estimation, assuming α=0.5. Submit all the value into eq 1, $E_0$ is calculated to be 82.8 μJ.

Regarding a single unit of the TENG-NW unit 600, one collision will generate two current peaks with identical $I_{sc} \cdot \Delta t$, consequently, the generated average power $E_c$ in one collision can be estimated as:

$$E_c = 2E_0$$

The generated power per second per unit volume $E_{cv}$ can be expressed as:

$$E_{cv} = f \cdot \beta \cdot \frac{E_c}{V_o}$$

where $\beta$ is the volume ratio of TENG 600, since all of the units in the TENG 600 is not close packing. Here, $\beta$ is designed to be 0.6. $V_o$ as the effective volume of a single unit. According to the experimental design, $V_o$=6 cm·12 cm 12 cm=864 cm³·f is the ball collision frequency, assuming an average collision frequency is 2 Hz for the ocean wave. Thus, $E_{cv}$ is estimated to be 0.23 J/m³.

Features as extremely light-weight, high anticorrosion to the marine environment, it is reasonable to construct the TENG-NW unit 600 with a depth of 5 meters in the ocean, then, the generated energy in a water area of 1 square kilometer per second could be estimated as:

$$E = 5 \text{ m} \cdot 1 \text{ km}^2 E_{cv}$$

Combining these equations, E can thus be calculated to be 1.15 MJ.

Figure 8:
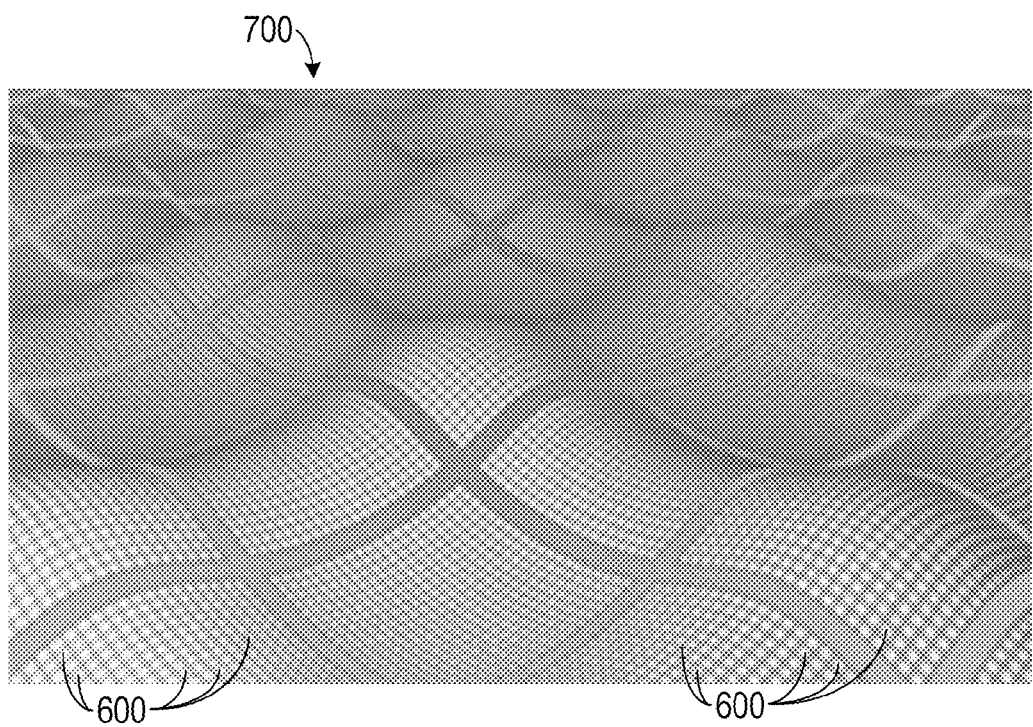
FIG. 8 is a schematic diagram of a wave energy harvesting unit.

Consequently, an average power output of 1.15 MW was expected in a water area of 1 kilometer square for the reported TENG-NW unit 600. To demonstrate its feasibility as a practical power source, a small scale TENG-NW unit 600 was developed with four units connected in parallel. As displayed in FIG. 5a, a small TENG-NW unit 600 with 4 units is floating on the water surface of a home swimming pool. As a light wind passed by, the aroused gentle wave can start to drive the TENG-NW unit 600, which is capable of realizing a self-powered SOS system for ocean emergency. As shown in FIG. 8, a plurality of TENG-NW units 600 can be coupled together in a web 700 that can be used to harvest wave energy over a large area.

Creatively harnessing the surface charging effect between the conventional polymers and very thin layer of metal as electrodes, the triboelectrification based TENG-NW unit 600 features as light-weight, extremely cost-effective, easy implementation, environmentally friendly, high anticorrosion to the marine environment and capable of floating on the water surface. Through rational structural design, the reported TENG-NW unit 600 excels in conversion of the slow, random and high-force oscillatory motions into electricity. And an average power output of 1.15 MW was expected in a water area of 1 square kilometer. And a multi-layer electrical connection for the TENG-NW unit 600 is proposed. Resort to tuning the numbers of units, communities in the TENG-NW unit 600, the current and voltage parameters, including amplitudes, peak density, frequency, as well as the output power is designable. From the perspective of system configuration, the TENG-NW unit 600 concept still paves a unique way in power management for the triboelectrification based large-scale energy harvesting. Holding a high sensitivity to external wave motion, the present TENG-NW unit 600 can not only be used to harvest strong wave motion from ocean, but also can be applied in various other circumstances, where the wave is gentle, such as in a lake, river or home swimming pool.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A generator for harvesting energy from water in motion, comprising:
   (a) a sheet of a hydrophobic material, having a first side and an opposite second side, that is triboelectrically more negative than water;
   (b) a first electrode sheet disposed on the second side of the sheet of a hydrophobic material; and
   (c) a second electrode sheet disposed on the second side of the sheet of a hydrophobic material and spaced apart from the first electrode sheet,
   so that movement of the water across the first side induces an electrical potential imbalance between the first electrode sheet and the second electrode sheet.

2. The generator of claim 1, wherein the sheet of a hydrophobic material comprises a fluorinated ethylene propylene (FEP) thin film.

3. The generator of claim 1, wherein the sheet of a hydrophobic material has a surface texture that includes a plurality of nanoscale features extending from the first side.

4. The generator of claim 3, wherein the nanoscale features comprise vertically aligned nanowires.

5. The generator of claim 4, wherein the vertically aligned nanowires have an average diameter of about 100 nm and an average length of about 2 μm.

6. The generator of claim 4, wherein the vertically aligned nanowires comprise ion etched nanowires.

7. The generator of claim 1, wherein the first electrode sheet and the second electrode sheet comprise a conductive metal.

8. A generator for harvesting energy from water in motion, comprising:
   (a) a confining frame
   (b) at least one contact mode triboelectric nanogenerator disposed within the confining frame;
   (c) an inertial member disposed within the confining frame, the inertial member having at least one degree of freedom of movement and disposed to be able to impart force on the at least one contact mode triboelectric nanogenerator when the confining frame is moved during wave action, thereby causing the triboelectric generator to generate and electrical current.

9. The generator of claim 8, wherein the contact mode triboelectric nanogenerator comprises:
   (a) a flexible housing defining an internal volume therein, the flexible housing having a relaxed state and a compressed state;
   (b) at least one generator unit disposed within the internal volume, the first generator unit including:
      (i) an electrode sheet;
      (ii) a dielectric sheet that is characterized by including a material that is ranked at a first position on a triboelectric series, the dielectric sheet having a first side and an opposite second side, the second side affixed to the electrode sheet, the dielectric sheet having a plurality of vertically aligned nanowires that extend outwardly from the first side of the dielectric sheet;
      (iii) a planar conductive sheet that is characterized by including a material that is ranked at a second position on a triboelectric series that is different from the first position,
      wherein the planar conductive sheet and the dielectric sheet a supported by the housing so that the planar sheet is in contact with the dielectric sheet when the housing is in the compressed state and so that so that the planar conductive sheet is not in contact with the dielectric sheet when the housing is in the relaxed state, thereby generating a charge imbalance between the electrode sheet and the planar conductive sheet as a result of a triboelectric charge build up on the dielectric sheet as a result of the dielectric sheet coming into and out of contact with the planar conductive sheet.

10. The generator of claim 9, wherein the dielectric sheet and the vertically aligned nanowires comprise polytetrafluoroethylene.

11. The generator of claim 9, wherein the electrode sheet comprises copper.

12. The generator of claim 9, wherein the planar conductive sheet comprises aluminum.

13. The generator of claim 9, wherein the planar conductive sheet includes a plurality of nanoscale dimples extending inwardly from the surface thereof.

14. The generator of claim 8, wherein the flexible housing comprises:

(a) two curved flexible plastic members facing each other so as to define an open volume therebetween, each flexible plastic member having two spaced apart vertical walls extending inwardly therefrom, a lateral sheet coupled to the end of each of the vertical walls; and (b) a rigid plastic sheet spaced between the two flexible plastic members, wherein a generator unit is placed between each lateral sheet and the rigid plastic sheet so that the flexible housing supports two different generator units.

15. The generator of claim 14, wherein the flexible plastic members comprise polyethylene terephthalate and wherein the rigid plastic sheet comprises acrylic.

16. The generator of claim 8, wherein the confining frame is hermetically sealed so as to seal the at least one contact mode triboelectric nanogenerator and the inertial member therein.

17. A plurality of generators of the type recited in claim 8 coupled to a web.

* * * * *